United States Patent
Crawford

(10) Patent No.: US 8,191,901 B2
(45) Date of Patent: Jun. 5, 2012

(54) MINIMAL THICKNESS, DOUBLE-SIDED FLANGES FOR ULTRA-HIGH VACUUM COMPONENTS

(75) Inventor: Charles K. Crawford, Wilton, NH (US)

(73) Assignee: Kimball Physics, Inc., Wilton, NH (US)

( * ) Notice: Subject to any disclaimer, the term of this patent is extended or adjusted under 35 U.S.C. 154(b) by 1679 days.

(21) Appl. No.: 10/934,833

(22) Filed: Sep. 3, 2004

(65) Prior Publication Data

US 2005/0035557 A1 Feb. 17, 2005

Related U.S. Application Data

(63) Continuation-in-part of application No. 10/014,164, filed on Oct. 26, 2001, now abandoned.

(60) Provisional application No. 60/243,526, filed on Oct. 26, 2000.

(51) Int. Cl.
F16L 23/00 (2006.01)
F16L 17/06 (2006.01)

(52) U.S. Cl. ........ 277/608; 277/609; 277/616; 277/649; 285/368

(58) Field of Classification Search .................. 277/608, 277/609, 619, 626, 627, 649; 285/363, 368
See application file for complete search history.

(56) References Cited

U.S. PATENT DOCUMENTS

| | | | |
|---|---|---|---|
| 1,292,060 A * | 1/1919 | Richards | 277/623 |
| 1,462,698 A * | 7/1923 | Haughey | 285/412 |
| 2,282,552 A | 5/1942 | Banowetz | 285/331 |
| 2,532,891 A | 9/1948 | Chupp | 285/130 |
| 2,513,178 A * | 6/1950 | Jackson | 285/363 |
| 3,151,869 A * | 10/1964 | Butcher | 277/612 |
| 3,208,758 A * | 9/1965 | Carlson et al. | 277/638 |
| 3,211,478 A * | 10/1965 | Batzer | 285/328 |
| 3,302,953 A * | 2/1967 | Glasgow | 277/611 |
| 3,930,656 A | 1/1976 | Jelinek | 277/180 |
| 4,303,251 A | 12/1981 | Harra et al. | 277/236 |
| 4,482,161 A * | 11/1984 | Izzi, Sr. | 277/606 |
| 4,616,860 A | 10/1986 | Faria et al. | 285/336 |
| 4,718,637 A | 1/1988 | Contin | 251/158 |
| 4,750,370 A * | 6/1988 | Ossyra | 73/861.61 |
| 4,988,130 A * | 1/1991 | Obara et al. | 285/328 |
| 5,163,712 A | 11/1992 | Sabo et al. | 285/7 |
| 5,333,919 A * | 8/1994 | Nerenberg | 285/363 |
| 5,437,482 A * | 8/1995 | Curtis | 285/148.13 |
| 5,492,373 A | 2/1996 | Smith | 285/175 |
| 5,564,715 A * | 10/1996 | Wallace | 277/612 |
| 5,593,123 A * | 1/1997 | Crawford | 248/231.21 |
| 5,630,592 A * | 5/1997 | Obara et al. | 277/614 |
| 5,671,956 A * | 9/1997 | Crawford | 285/328 |

(Continued)

OTHER PUBLICATIONS

MDC Vacuum Catalogue of 2003, "Del-SEal CF Flanges, double sided", pp. 56-59.*

(Continued)

*Primary Examiner* — Alison Pickard

(74) *Attorney, Agent, or Firm* — Maine Cernota & Rardin

(57) ABSTRACT

A thin flange, for use with a vacuum system, includes a member having a diameter and a thickness. The member has a first face having a first sealing surface. The member has a second face opposed and substantially parallel to the first face. The second face has a second sealing surface. The thickness of the member is less than previously attained. In some designs, the thickness of the member is less than 0.28 inches.

9 Claims, 13 Drawing Sheets

U.S. PATENT DOCUMENTS

| | | | | |
|---|---|---|---|---|
| 5,673,946 A | * | 10/1997 | Barber et al. | 285/328 |
| 5,683,523 A | * | 11/1997 | Nakanose et al. | 148/317 |
| 5,685,576 A | | 11/1997 | Wolfe et al. | 285/149 |
| 5,723,814 A | | 3/1998 | Kolbl et al. | 174/31 R |
| 5,772,773 A | | 6/1998 | Wytman | 118/729 |
| 5,836,623 A | * | 11/1998 | Bothell et al. | 285/148.9 |
| 5,884,946 A | | 3/1999 | Esser | 285/368 |
| 5,921,589 A | | 7/1999 | Dubois | 285/49 |
| 6,042,121 A | * | 3/2000 | Ma et al. | 277/608 |
| 6,050,614 A | | 4/2000 | Kirkpatrick | 285/368 |
| 6,270,045 B1 | | 8/2001 | Crawford | 248/231.21 |
| 6,325,390 B1 | * | 12/2001 | Sillmon | 277/614 |
| 6,419,279 B1 | | 7/2002 | Latham | 285/261 |
| 6,620,250 B2 | * | 9/2003 | Brezoczky et al. | 118/715 |
| 6,695,357 B2 | * | 2/2004 | Schenk et al. | 285/355 |
| 2002/0050689 A1 | * | 5/2002 | Crawford | 277/608 |

OTHER PUBLICATIONS

Brochure: 2003a Source Product Guide (4 pages).
Brochure: 2003a Multi-CF Product Guide (4 pages).

* cited by examiner

MINIMAL THICKNESS, DOUBLE-SIDED FLANGES FOR ULTRA-HIGH VACUUM COMPONENTS

CROSS-REFERENCE TO RELATED APPLICATIONS

The present application is a continuation-in-part of U.S. patent application Ser. No. 10/014,164, filed on Oct. 26, 2001 now abandoned, which claims the benefit of U.S. provisional application Ser. No. 60/243,526, filed on Oct. 26, 2000, the teachings of which are incorporated herein by reference.

FIELD OF INVENTION

The present invention relates to ultra-high vacuum systems and, specifically, to a system for the insertion of components on a reduced thickness flange between two standard thickness flanges.

BACKGROUND OF THE INVENTION

Vacuum systems find wide applications in research, education, product development, and production. Typical systems comprise independent and interchangeable components. Such components may include testing chambers, pumps, gauges, valves, specimen manipulators, testing apparatus, radiation sources, particle detectors, heating and cooling systems, and other components known in the industry.

Processes or experiments that require high or ultra-high vacuum (UHV) currently employ all metal vacuum joints. A typical flange 20 for an all-metal joint is illustrated in FIG. 1. Such a joint is comprised of at least two flanges 20, 24 illustrated in FIG. 2. Each of the flanges 20, 24 includes an annular recess 26, 28 and an annular knife edge 30, 32. The flanges 20, 24 are configured for mating using a soft, metallic gasket 34 (e.g. a copper gasket). The opposing knife edges 30, 32 are pressed into the gasket 34 when the flanges 20, 24 are compressed together by tightening bolts 38. The knife edges 30, 32 in combination with the gasket 34 form a UHV seal.

The force of the tightened bolts 38 is transferred to the gasket 34 through the thickness of the flanges 20, 24. The bolt holes 36 are disposed on a diameter that is outside that of the knife edge 30, 32. If the standard flange 20, 24 is not of appropriate thickness, the flanges 20, 24 may deform as depicted in FIGS. 3 and 4. The deformed flange 25A in FIG. 3 is considered a dish-shaped deformation and results from the flange 25A bowing around the perimeter of the gasket. The deformed flange 25B in FIG. 4 is a wave-like deformation and results from deflection of the flange 25B between bolts in the all-metal joint. The bowing of the flange 25A occurs due to the moment arm between the knife edge 30, 32 and the bolt 38. In the case of a deflection or deformation, such as those illustrated in FIGS. 3 and 4, the seal may leak if the force placed on the gasket 34 between the adjacent bolts 38 is less than the force required to press the knife edges 30, 32 sufficiently into the gasket 34 to form a seal. Only an appropriate thickness of the flange provides adequate resistance to deformation in this situation.

Thus, a heretofore unaddressed need exists in the industry to address the aforementioned deficiencies and inadequacies.

SUMMARY OF THE INVENTION

Embodiments of the present invention provide a system and method for providing a thin flange.

Briefly described, in architecture, one embodiment of the system, among others, can be implemented as follows. A thin flange, for use with a vacuum system, includes a member having a diameter and a thickness. The member has a first face having a first sealing surface. The member has a second face opposed and substantially parallel to the first face. The second face has a second sealing surface. The thickness of the member is less than previously attained. In some designs, the thickness of the member is less than 0.28 inches. In other designs, the thickness of the member is less than fifteen percent of the diameter of the member.

Other systems, methods, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Exemplary embodiments of the invention are set forth in the following description and shown in the drawings, wherein.

DETAILED DESCRIPTION

Referring to FIGS. 6 through 10, various exemplary embodiments of double-sided thin flanges consistent with the present invention are illustrated. It should be understood that the term "thin flange", as used herein, is not so much an absolute dimensional characterization as it is a convenient designation, indicating that the flange is not required to be thick enough to withstand the asymmetric stress and deflection imposed by the clamping bolts. The thickness of the thin flange is not needed to withstand the asymmetric stress and deflection imposed by the clamping bolts because the thin flange receives symmetric force from flanges on opposite sides of the thin flange through gaskets crushed between the thin flange and each of the other flanges. The thickness of the thin flange is rather determined primarily by the thickness required to provide the instantly desired mounting characteristics or features—i.e., mounting grooves, threaded bores, feed-throughs, etc., as discussed in the following description of the invention.

The present invention is based upon the innovative idea that double-sided flanges, which are generally intended to be sandwiched between two standard thickness flanges, do not need to be thick enough to withstand the stress and deflection imposed by the clamping bolts. The primary force applied to the standard thickness flanges is applied asymmetrically at the interspersed bolt holes. Therefore, as previously described, the standard thickness flanges must be strong enough and, thereby, thick enough to avoid deformation of the standard thickness flange due to the uneven forces applied at the area around the bolt holes and the area of the standard thickness flange between consecutive bolt holes. The thin flanges of the present invention, however, do not receive a primary force at the bolt hole location because, in part, the bolts do not attach to the thin flange and therefore, do not apply any force directly to the thin flange. Instead, the force applied by tightening the bolts is communicated directly to the standard thickness flanges and the standard thickness flanges apply symmetric compressive force directly to the gaskets, which apply symmetric compressive force to the thin flange. Because the force applied from the standard thickness flanges, through the gaskets, to the thin flange is spread substantially equally across a sealing surface of each of the standard thickness flanges, the thin flanges do not need to be made thick to avoid deformation from asymmetric forces.

Figure 1:
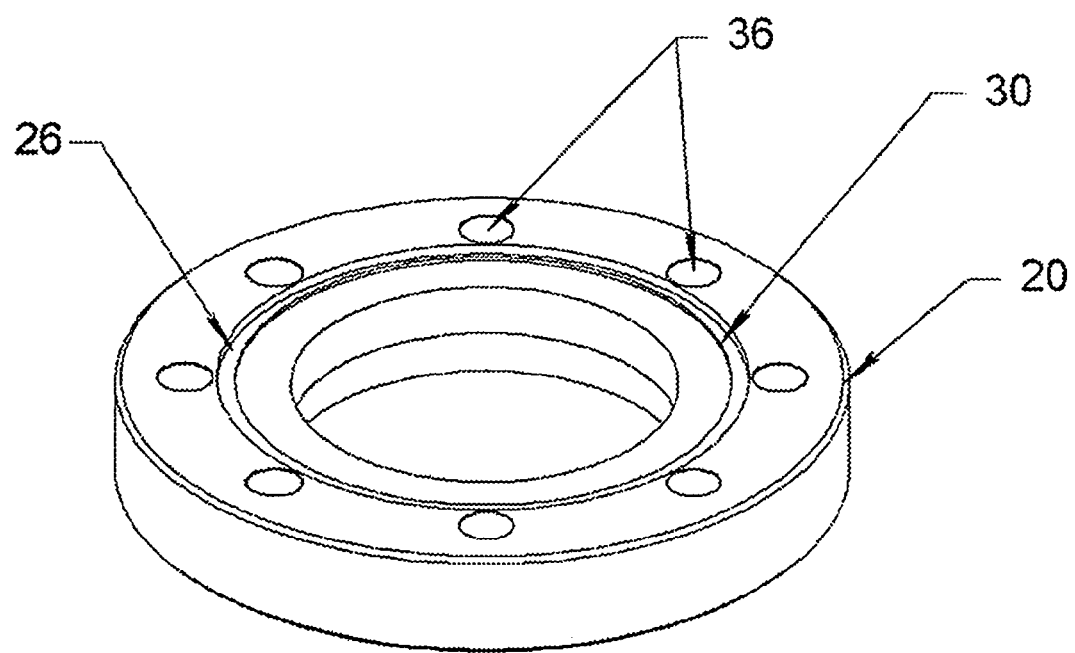
FIG. 1 is a perspective view of a prior art flange used for an all metal joint.
Figure 2:
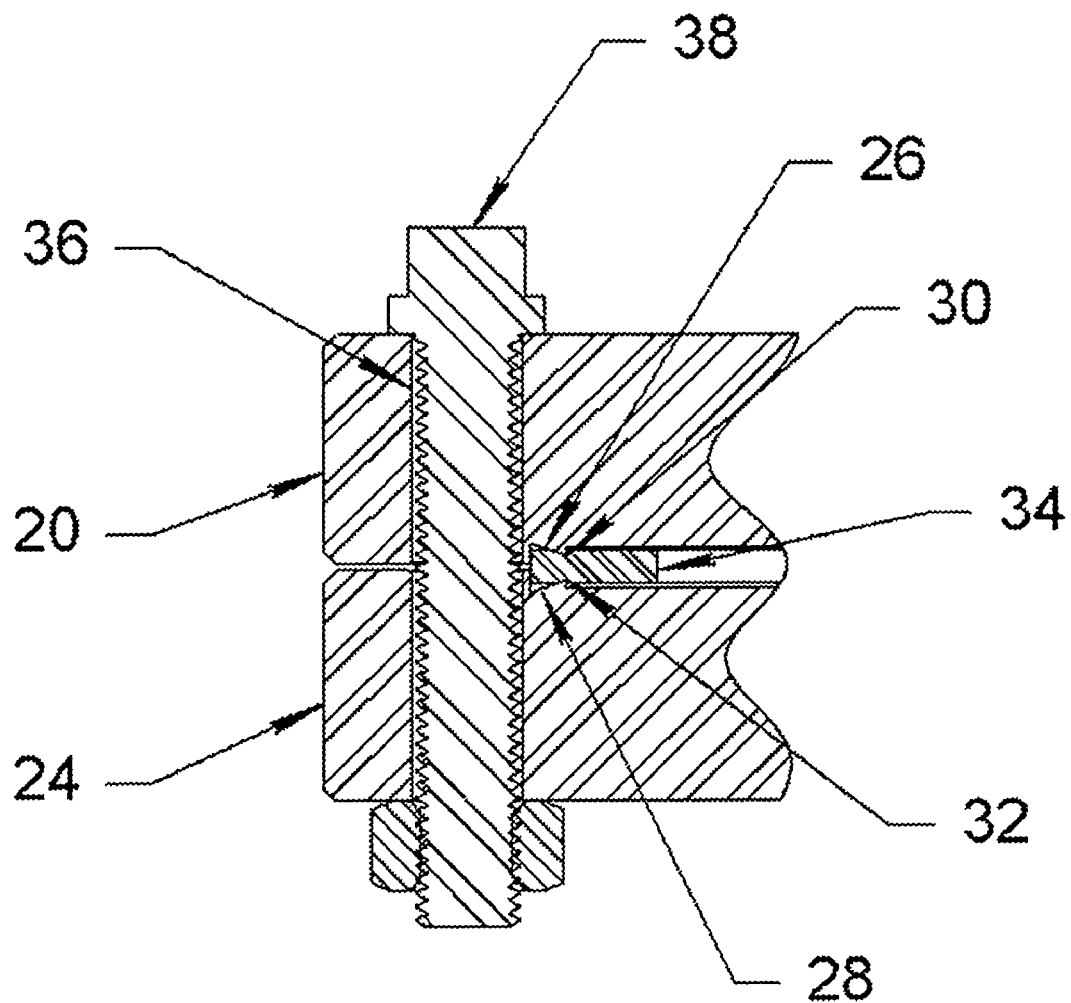
FIG. 2 is a partial cross-sectional view of a prior art seal.
Figure 3:
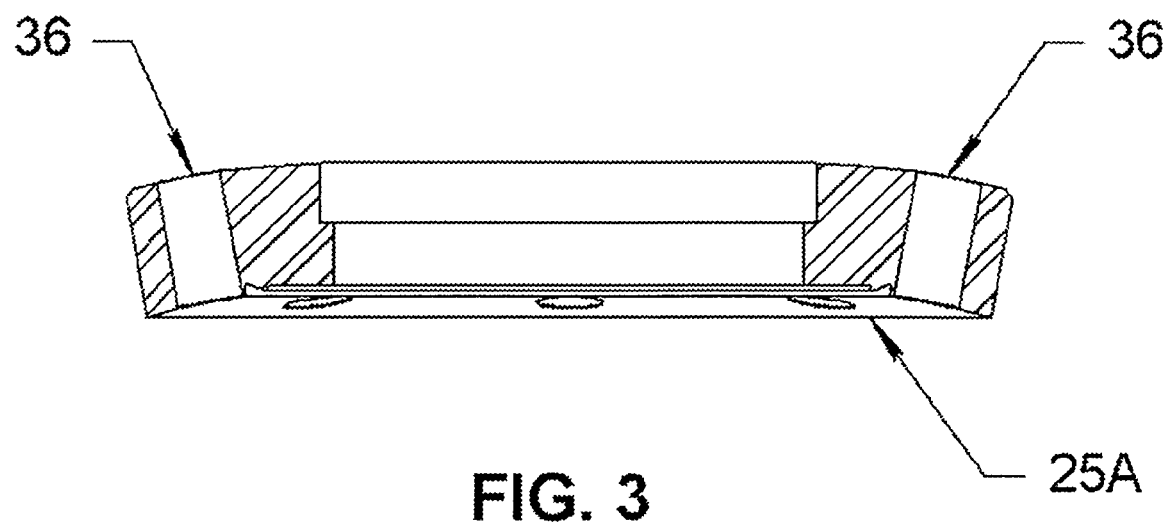
FIG. 3 is a cutaway view of a prior art flange with dish-shaped deformation.
Figure 4:
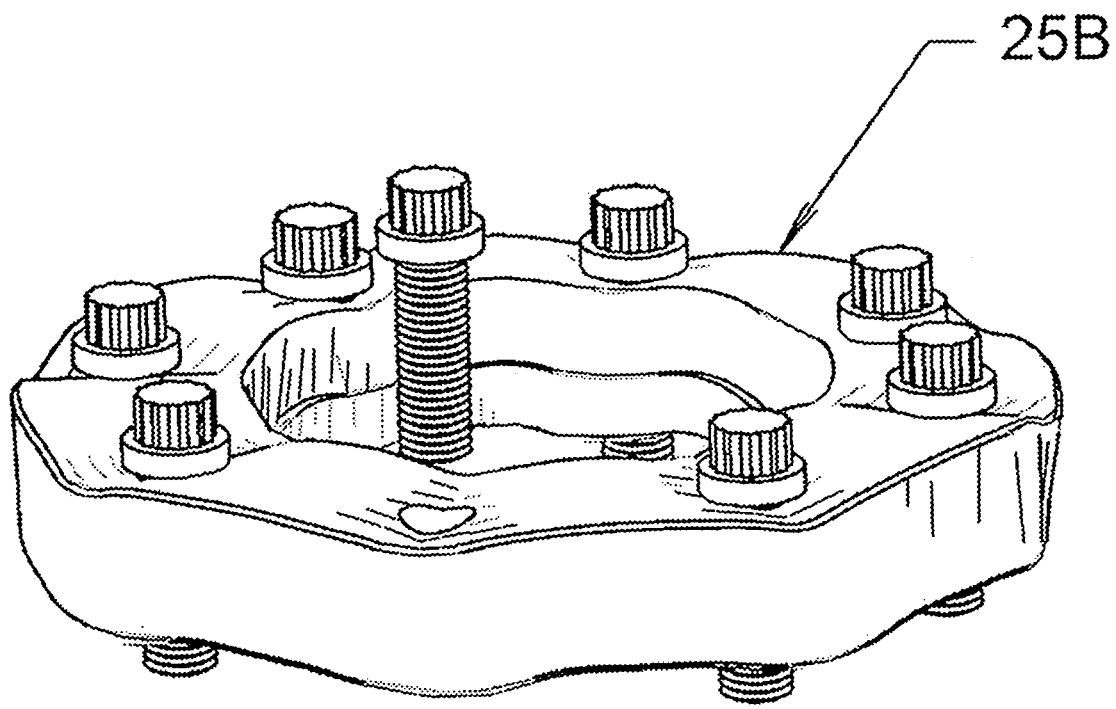
FIG. 4 is a perspective view of a prior art flange with wave-like deformation.
Figure 5:
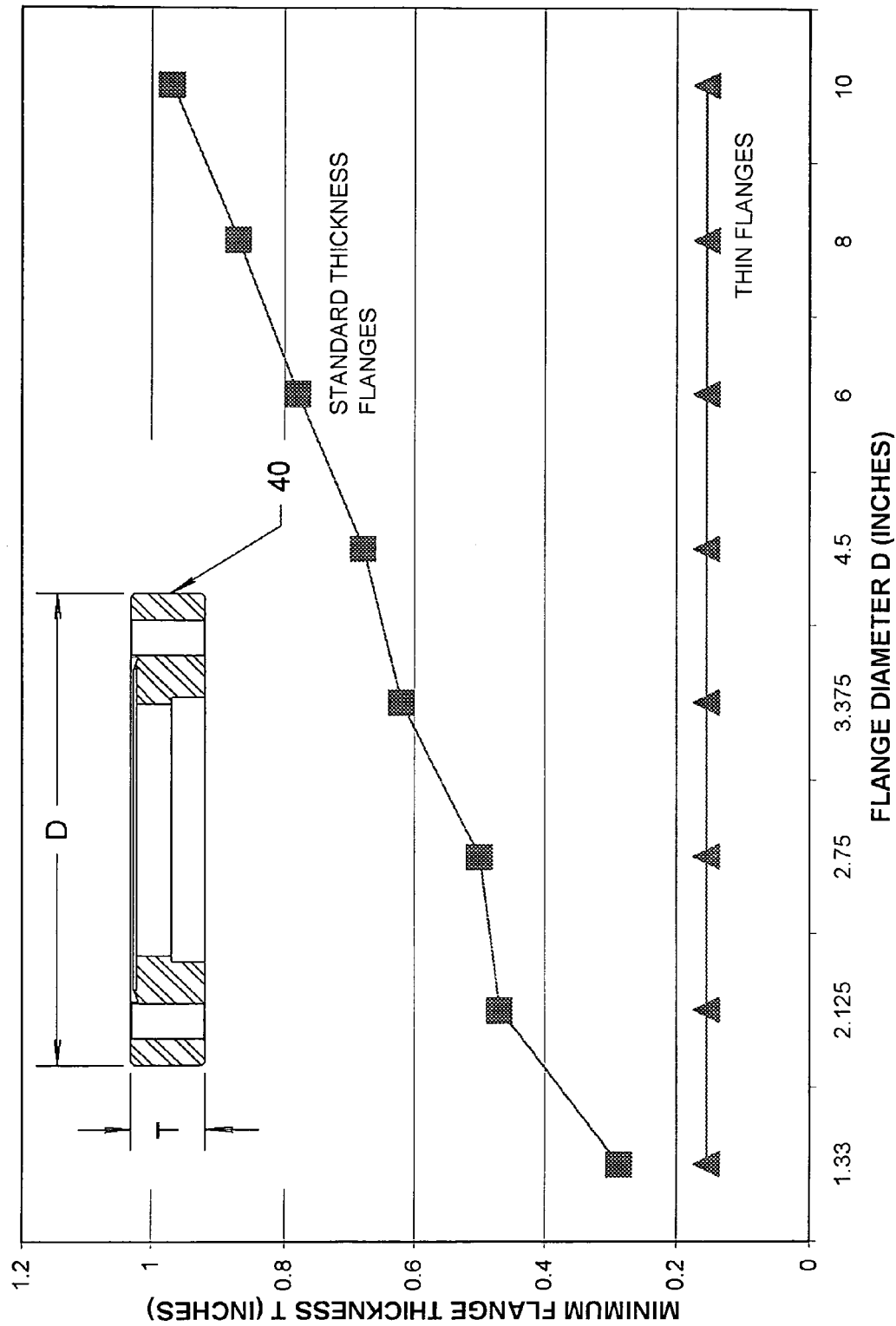
FIG. 5 is a graph illustrating the thickness of normal double-sided flanges, relative to diameter, as compared to the thickness of the thin flanges of the present invention and encapsulated within the graph is an image of a flange, illustrating the thickness and diameter measurements of the flange.

FIG. 5 is a graph that further illustrates the improvements of the present invention. The graph plots the minimum thickness available for industry standard flanges and for the thin flanges of the present invention against the corresponding diameter of the flanges, with the thickness T and diameter D illustrated in an image of a flange 40 within the graph of FIG. 5. The graph shows that a typical line of industry standard flanges has an increase in thickness as the diameter of the industry standard flanges increase. One of the motivations for this increase is durability, specifically the ability to avoid deformation. The present invention is based on the finding that flanges do not need to be made thicker to be durable. For all industry standard flange diameters shown, the present invention is capable of maintaining a thickness of 0.155 inches, as shown on the graph, which is presently the thickness required to maintain the two sealing surfaces. Should a sealing surface be designed that requires less thickness than those currently known, the present invention would be capable of maintaining a thickness below 0.155.

The present invention is also capable of maintaining any thickness between 0.155 inches and those thicknesses previously available. The present invention is capable of maintaining a thickness of 0.28 inches or below for any diameter double-sided flange. The present invention is capable of maintaining a thickness that is less than approximately 6.5% of the diameter of the double-sided flange. For double-sided flanges with a diameter of less than five inches, the present invention is capable of maintaining a thickness that is less than approximately 15% of the diameter of the double-sided flange. For double-sided flanges with a diameter of greater than five inches, the present invention is capable of maintaining a thickness of 0.75 inches or less.

FIGS. 6 through 8C show details of a first exemplary embodiment of a thin flange 40 having a first face 41 on which is located a first sealing surface 42 to crush a metallic gasket 44A against a standard thickness flange 48 for forming an all-metal joint. The thin flange 40 further features second face 49 on which is located a second sealing surface 50 to crush a metallic gasket 44B against a standard thickness flange 54 for forming the all-metal joint. A plurality of bolt holes 46 are located outside of a perimeter of the sealing surfaces 42, 50 to provide an access way for securing the standard thickness flanges 48, 54 with the bolts 45. The bolt holes 46 provide alignment of the thin flange 40 relative to the standard thickness flanges 48, 54 prior to sealing. Once the seal is formed, by tightening the bolts 45 and crushing the gaskets 44A, 44B, no support is provided to the thin flange 40 by the bolts 45.

Figure 6:
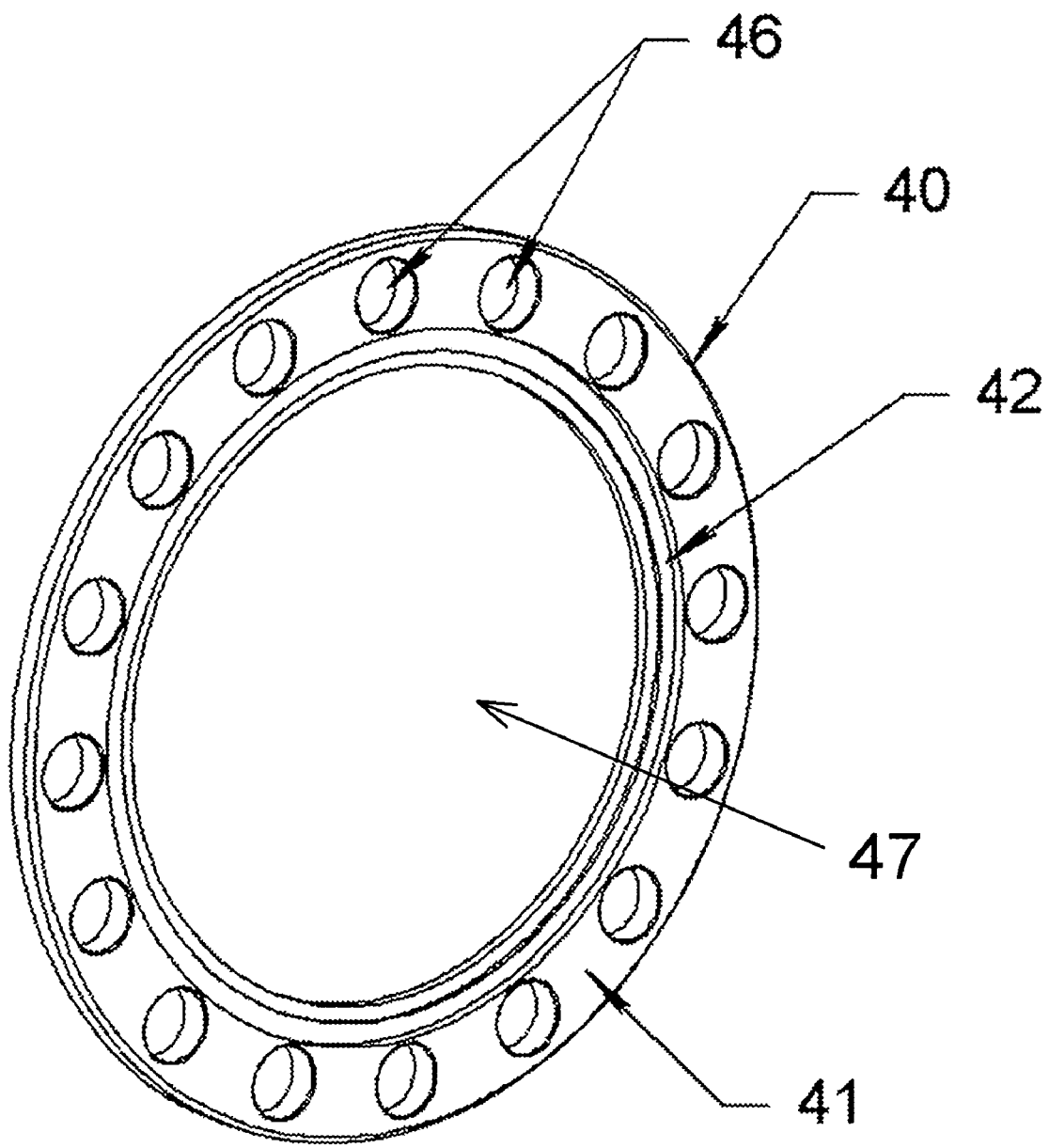
FIG. 6 is a perspective view of a first exemplary embodiment of a thin flange consistent with the present invention.
Figure 7:
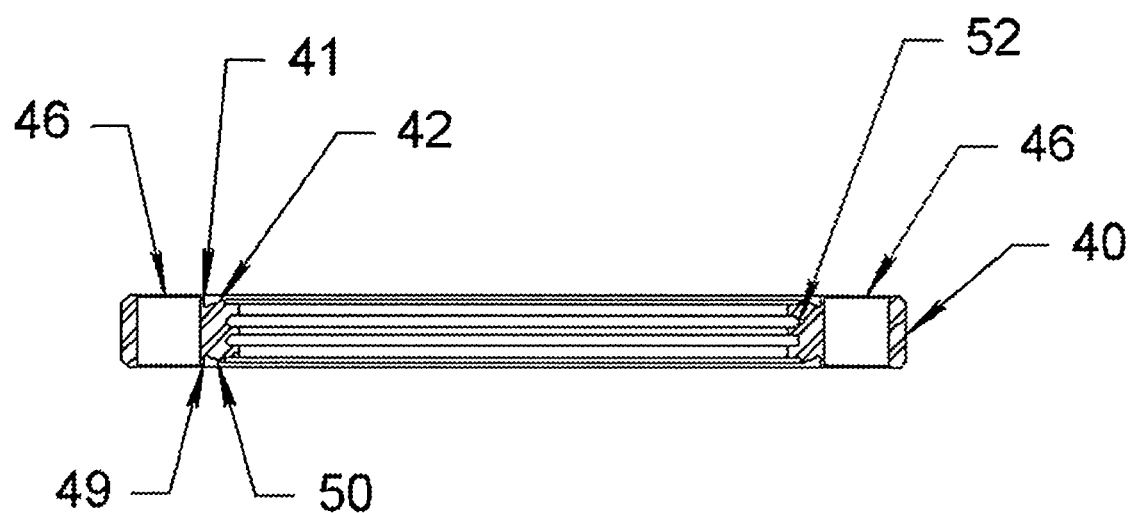
FIG. 7 is a sectional view of the first exemplary embodiment of the thin flange consistent with the present invention.

FIG. 6 is a prospective view of the first exemplary embodiment of the present invention. FIG. 7 is a cross-sectional view of the thin flange 40 shown in FIG. 6. This cross-section shows the details of the sealing surfaces 42, 50, which are knife edges in this embodiment. Consistent with the present invention, internal vacuum components may be mounted using equipment-mounting grooves 52. These specific equipment mounting grooves 52 permit the mounting of internal vacuum system components (not shown). As illustrated, the equipment-mounting grooves 52 are disposed in a region of the thin flange 40 located within the perimeter of the sealing surfaces 42, 50. Accordingly, components may be mounted extending out of the confines of the thin flange 40. Consistent with this configuration, components may be mounted to the vacuum system over a shorter distance than previously possible because the thin flange 40 eliminates the need for a tube or standard fittings or an independent structurally thick double-sided flange. Not only does the decrease in length required to mount components make the system more convenient in space-limited applications, the decrease in length also increases the conductance of the vacuum system.

Figure 8:
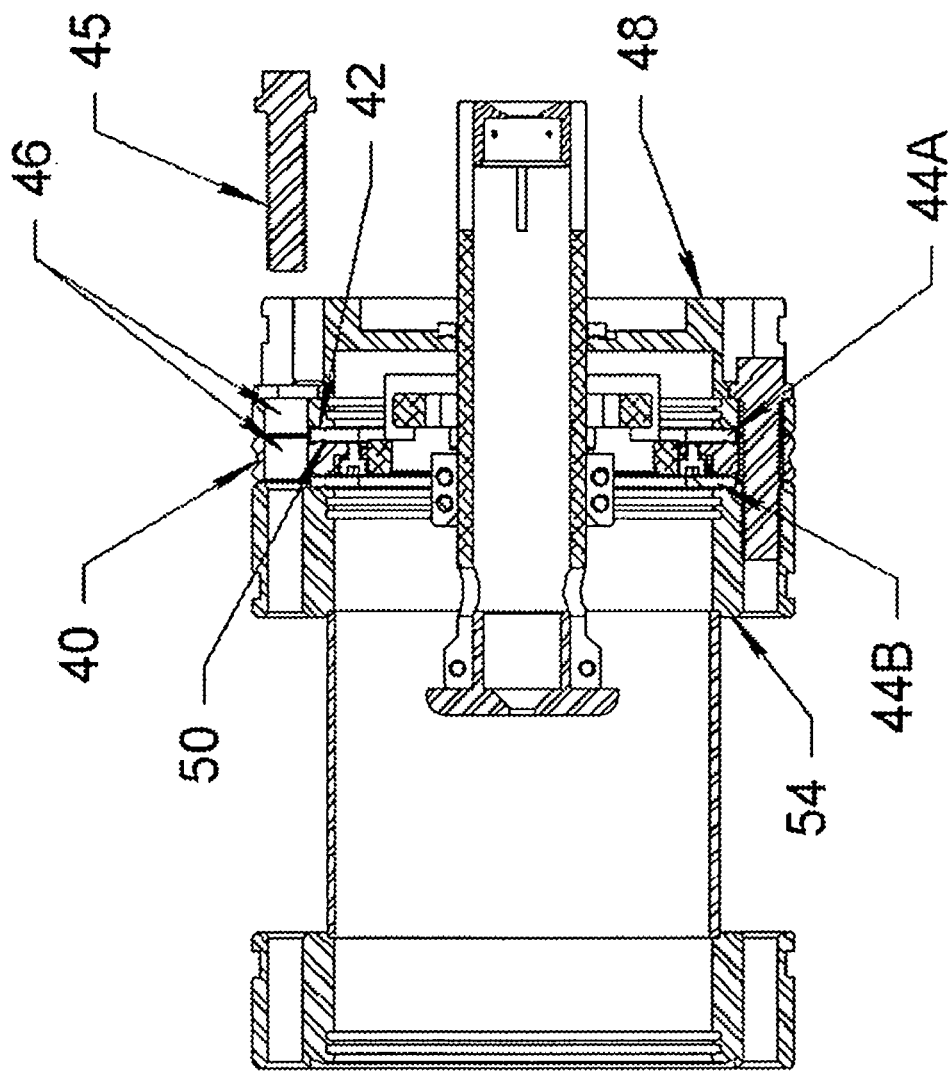
FIGS. 8 through 8C illustrate an application of the first exemplary embodiment of the thin flange consistent with the present invention.
Figure 8A:
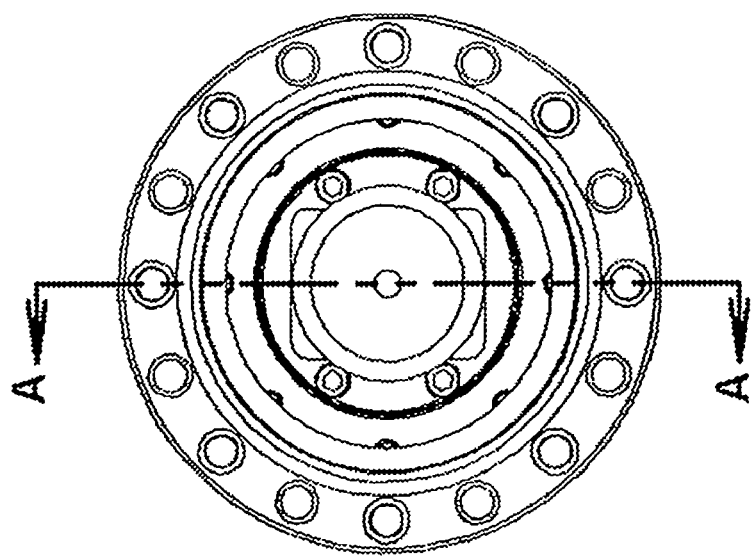
Figure 8B:
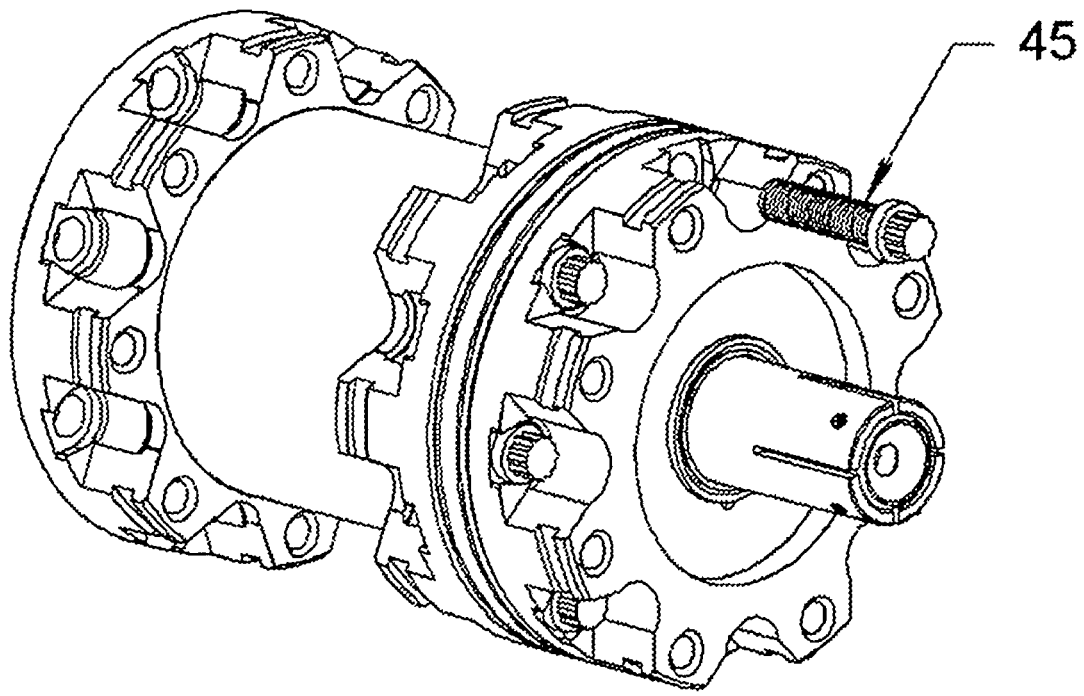
Figure 8C:
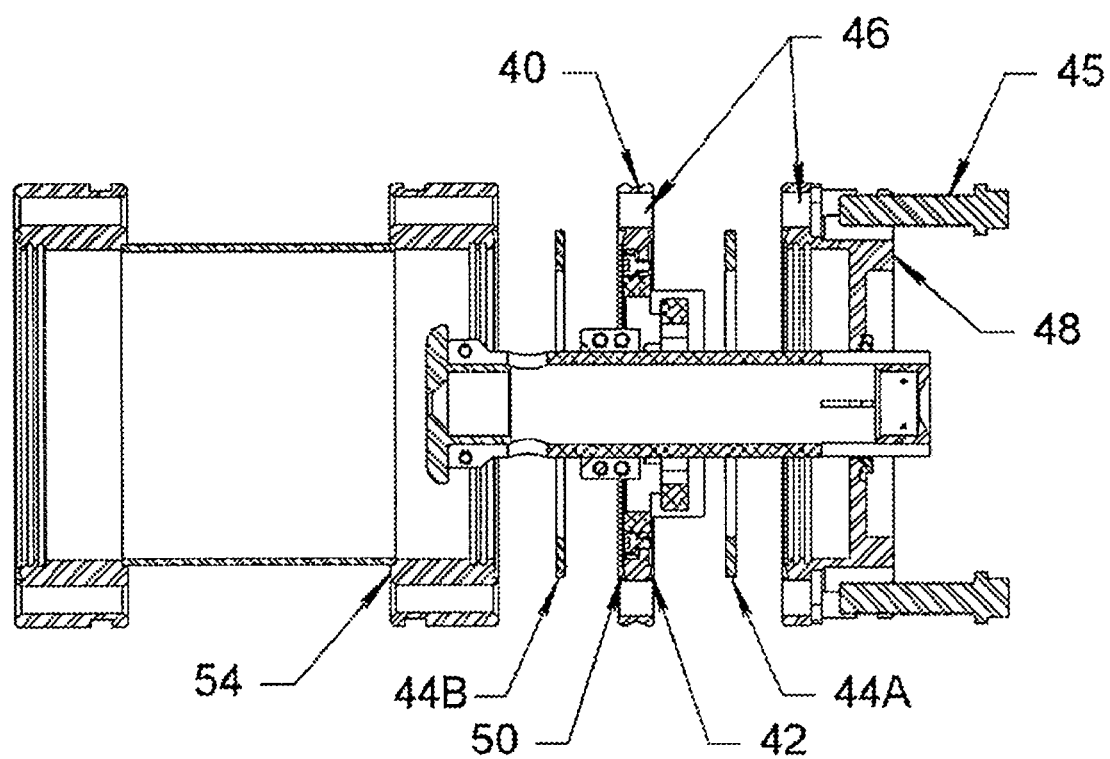

Referring to FIG. 8 and FIG. 8C, which is a partially exploded view of FIG. 8, there is shown an exemplary thin flange 40 mounted between two standard thickness flanges 48, 54. The two standard thickness flanges 48, 54 are sealed against respective sides of the thin flange 40 by crushed gaskets 44A, 44B. When the system is sealed, by tightening the bolts 45, the force exerted on the standard thickness flanges 48, 54 by the bolts 45 is effectively transferred by the rigid body of the standard thickness flanges 48, 54 to their respective sealing surfaces 42, 50 which substantially simultaneously crushes both metallic gaskets 44A, 44B. This, in turn, causes the crushed gaskets 44A, 44B to bear symmetrically against the inner side of the thin flange 40. Accordingly, the thin flange 40 experiences only symmetrical compressive loading about its thickness. The bolt holes 46 of the thin flange 40 are under zero load. Furthermore, the thin flange 40 is not subject to any bending loads, as may be the case with the standard thickness flanges 48, 54. This allows the thin flange 40 to be of a minimal thickness, only sufficient to resist the compressive forces and contain the sealing surfaces 42, 50. Accordingly, a membrane, window, or small aperture can be mounted within an opening 47 formed in the thin flange 40. Alternatively, the thin flange 40 could be constructed without an opening 47.

Figure 9:
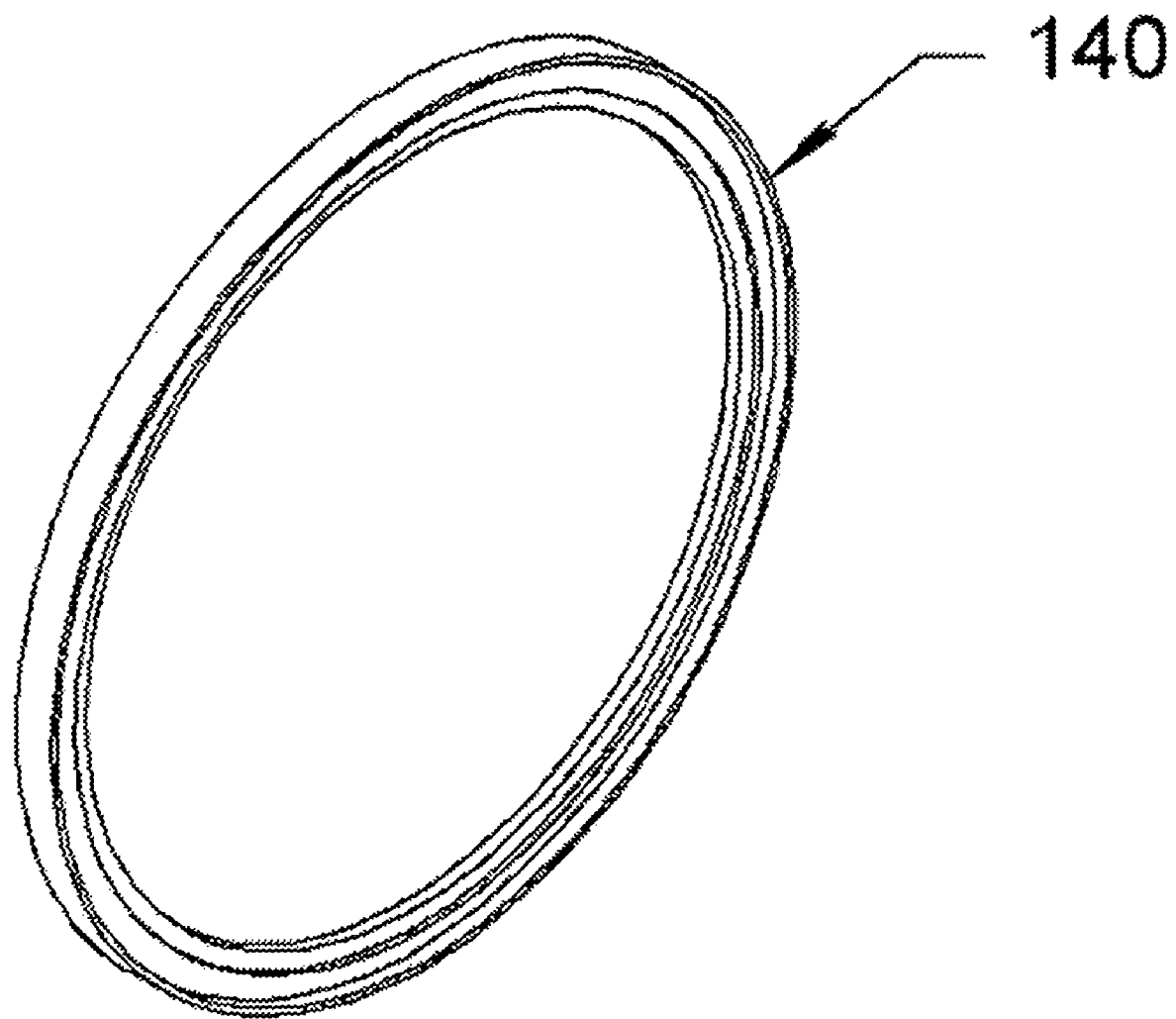
FIG. 9 is a perspective view of a second exemplary embodiment of the thin flange consistent with the present invention.
Figure 9A:
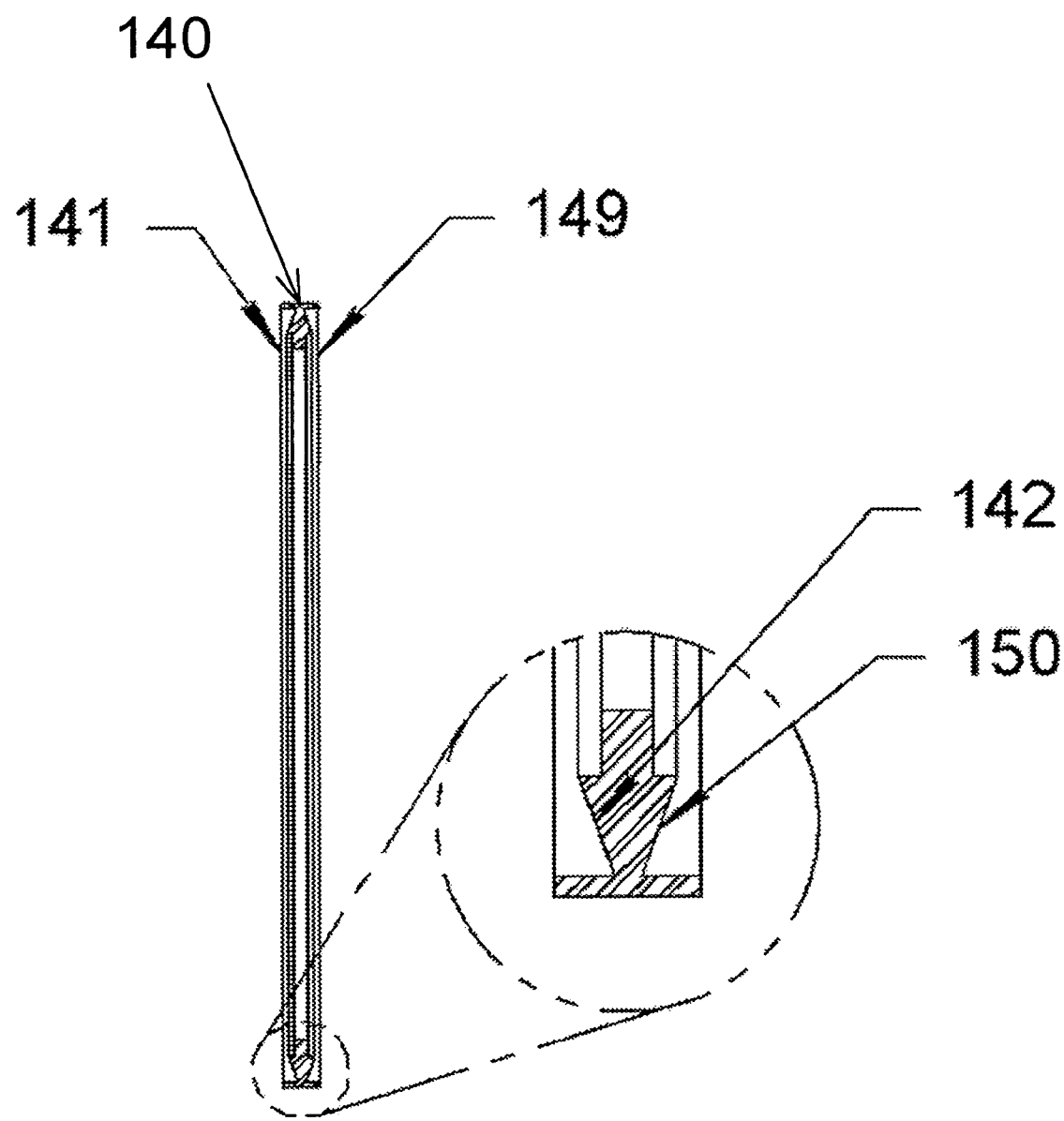
FIG. 9a is a cross-sectional view of the second exemplary embodiment of the thin flange, in accordance with FIG. 9.

Turning to FIG. 9 and FIG. 9A, there is illustrated a perspective view and a cross-sectional view of a second exemplary embodiment of the thin flange 140. The second exemplary thin flange 140 is configured without bolt holes. This embodiment is based on the realization that thin flanges are not supported by bolts and, therefore, can be constructed without bolt holes as long as the thin flange 140 can be mounted between two standard thickness flanges without interfering with the bolts for the standard thickness flanges. The thin flange 140, according to this embodiment, allows for arbitrary radial alignment to the mating system. The greater flexibility in radial alignment of the thin flange 140 is capable because placement of the thin flange 140 relative to the standard thickness flanges (not shown) is not restricted by the need to align bolt holes in the thin flange 140 with the bolt holes in the standard thickness flanges. As shown in FIG. 9A, little is needed beyond a sealing surface 142, 150 on each face 141, 149 of the thin flange 140 to create the second exemplary embodiment of the present invention. The thin flange 140 consistent with this exemplary embodiment is especially beneficial when an instrument or apparatus mounted to the thin flange 140 must be precisely aligned either within the vacuum system, or relative to another instrument or apparatus. The embodiment of the thin flange 140 shown in FIGS. 9 and 9A is designed to have a small enough outer diameter so as to avoid interfering with bolts of standard thickness flanges. Other variations of the thin flange 140 are also contemplated that avoid interfering with bolts of standard thickness flanges without minimizing the outer diameter of the thin flange 140 and without incorporating industry standard bolt holes.

Figure 10:
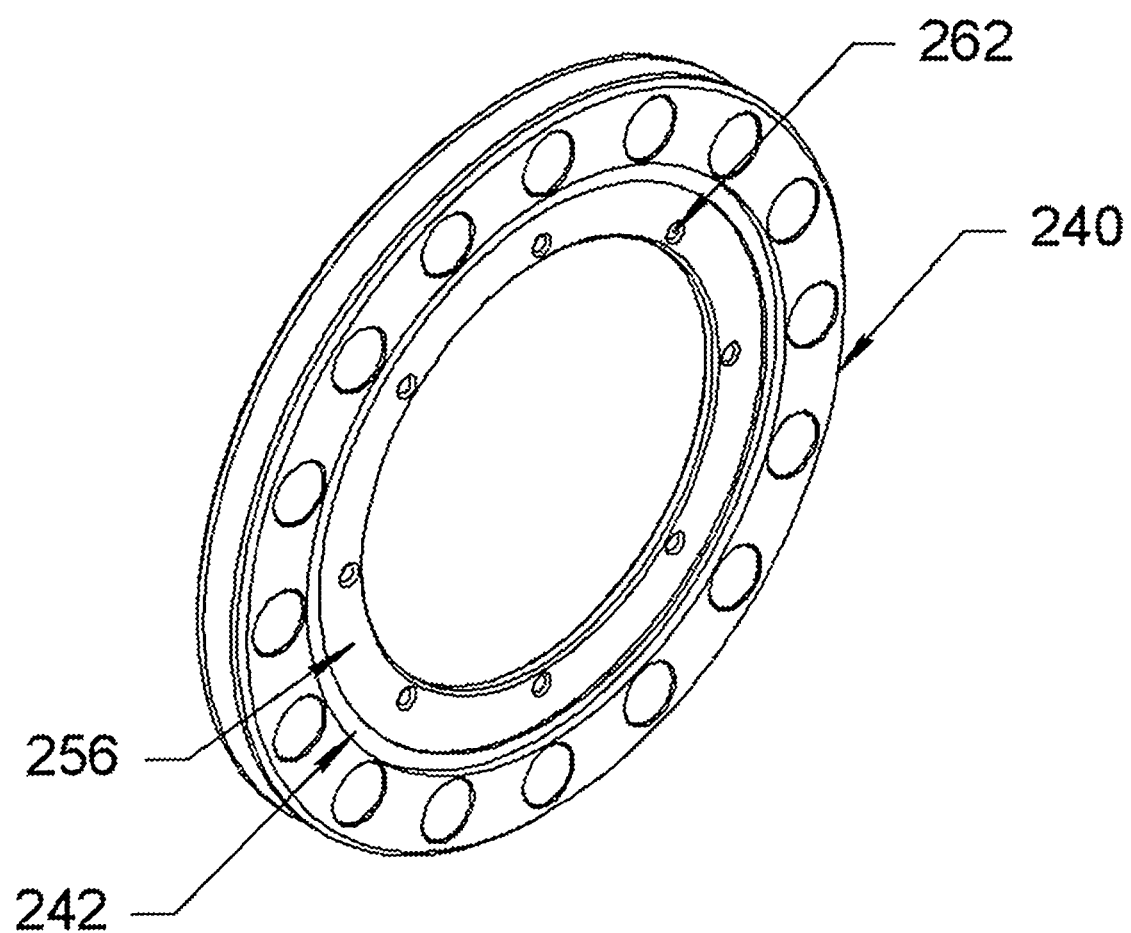
FIG. 10 is a perspective view of a third exemplary embodiment of the thin flange consistent with the present invention.

FIG. 10 illustrates in isometric view a third exemplary embodiment of a thin flange 240 consistent with the present invention. According to the third exemplary embodiment, the thin flange 240 comprises a series of mounting holes 262 disposed about an inner web 256, inside the perimeter of the sealing surfaces 242 (only one sealing surface is shown) of the flange 240. The mounting holes 262 may advantageously be configured to mount any variety of apparatus inside of the vacuum system. Accordingly, the mounting holes 262 may be arranged in a pattern that is standard to a variety of equipment, or the mounting holes 262 may be specially configured for individual pieces of apparatus. By employing a thin flange 240 as disclosed herein it is possible to align vacuum components and mating interior system components with a high level of dimensional precision.

In each of the above-described embodiments, the thin flange preferably is formed from a single unitary member. By machining the thin flange, including both of the sealing surfaces, from a single member it is possible to achieve very high tolerances. Additionally, it is possible to achieve a superior surface finish on the thin flange. This characteristic lends itself to higher conductance and greater cleanliness of the vacuum system, as well as accurate flange face parallelism.

Consistent with the above teachings, a thin flange of the present invention may be beneficially employed for mounting equipment within the vacuum system itself, as well as for an interface connecting items within the vacuum system to the exterior of the vacuum system. An exemplary application may be to conveniently provide an electrical feed-through for powering an apparatus inside the vacuum system while still maintaining the "vacuum tight" integrity of the system. Similarly, the inner web of the thin flange may be equipped with a valve, therein providing direct communication with interior of the vacuum system without decreasing the conductance of the system, which does result from typical valve mounting systems disposed on a couple or tube.

Further, the thin flange can mount an interior component, such as an electron gun, as well as provide an electrical feed-through. This is an improvement over having the electrical connections on a separate port of the vacuum chamber, as is conventionally the case. The advantage is that the connection does not need to be done at the location of the vacuum system since the component can be mounted within the thin flange and the electrical connections may be made as an independent subsystem. Should the component need to be removed from the vacuum system, the connection would not need to be disassembled and subsequently reassembled when the component was remounted. This configuration of components saves time, and may reduce the number of ports required on a main chamber of a vacuum system.

Further embodiments of the coupling flange obviously include different lengths, different industry standard flange sizes, different flange geometries, such as oval, rectangular, or other planar shape, and different interior mounting arrangements. On slightly thicker versions of the flange, radial ports may be added to increase access to internal components. The thin flanges could also be stacked, with the limit only being the twist up and stretch of the set of bolts.

In consideration of the various above-described embodiments and applications consistent with the present invention, it will be readily appreciated that the thin flanges consistent with the present invention may advantageously be employed in a stacked manner. Consistent with this, a plurality of thin flanges may be disposed between two standard thickness flanges, thereby providing a variety of mounting features, feed-throughs, valves, etc., while requiring only one port on the vacuum system. Because each of the thin flanges consistent with the present invention contain two sealing surfaces, any number of thin flanges may be coaxially disposed, with each pair having a soft metallic gasket disposed therebetween. Furthermore, as in the case of a single thin flange disposed between two standard thickness flanges, each of the thin flanges in the above described "stack" will experience only symmetrical forces, generally only compressive in nature, and therefore will not be subject to distortion or deflection resulting from the clamping bolts.

It should be emphasized that the above-described embodiments of the present invention, are merely possible examples of implementations, merely set forth for a clear understanding of the principles of the invention. Many variations and modifications may be made to the above-described embodiment of the invention without departing substantially from the spirit and principles of the invention. All such modifications and variations are intended to be included herein within the scope of this disclosure and the present invention and protected by the following claims.

What is claimed is:

1. A thin flange for use with a vacuum system, the thin flange comprising:
   a metal member having a diameter and a thickness;
   a first face of the member, the first face having a first sealing surface
   a second face of the member opposed and substantially parallel to the first face, the second face having a second sealing surface;
   wherein the thickness of the member is less than 0.16 inches; and
   wherein the first sealing surface comprises a knife edge and the second sealing surface comprises a knife edge.

2. The thin flange according to claim 1 further comprising a plurality of through holes configured to be alignable with a plurality of bolt holes disposed in a standard thickness flange.

3. The thin flange according to claim 1 comprising at least one mounting feature disposed within a perimeter defined by at least the first sealing surface.

4. The thin flange according to claim 3 wherein the at least one mounting feature comprises at least one groove formed in an inner surface.

5. The thin flange according to claim 3 wherein the at least one mounting feature comprises at least one threaded bore.

6. The thin flange according to claim 1 further comprising at least one feed-through.

7. The thin flange according to claim 1 further comprising an opening through a center of the member.

8. The thin flange of claim 1 wherein a first standard thickness flange abuts the first face and a second standard thickness flange abuts the second face.

9. A thin flange for use with a vacuum system, the thin flange comprising:
   an all metal member having a diameter and a thickness, wherein the thickness of the member is less than 0.16 inches;
   a first face of the member, the first face having a first sealing surface and the first face abutting a first standard thickness flange;
   a second face of the member opposed and substantially parallel to the first face, the second face having a second sealing surface and the second face abutting a second standard thickness flange;
   at least one all metal gasket between the member and at least one of the first standard thickness flange and the second standard thickness flange; and
   a plurality of bolts clamping the first standard thickness flange to the second standard thickness flange; wherein the bolts apply sufficient force to crush the gasket without deformation of the member.

* * * * *